US009019814B1

United States Patent
Mohanty et al.

(10) Patent No.: US 9,019,814 B1
(45) Date of Patent: Apr. 28, 2015

(54) FAST FAILOVER IN MULTI-HOMED ETHERNET VIRTUAL PRIVATE NETWORKS

(71) Applicant: Juniper Networks, Inc., Sunnyvale, CA (US)

(72) Inventors: Satya Ranjan Mohanty, Sunnyvale, CA (US); Wen Lin, Andover, MA (US); John E. Drake, Pittsburgh, PA (US)

(73) Assignee: Juniper Networks, Inc., Sunnyvale, CA (US)

(*) Notice: Subject to any disclaimer, the term of this patent is extended or adjusted under 35 U.S.C. 154(b) by 127 days.

(21) Appl. No.: 13/959,731

(22) Filed: Aug. 5, 2013

(51) Int. Cl.
*G06F 11/00* (2006.01)
*H04L 12/24* (2006.01)
*H04L 12/707* (2013.01)
*H04L 12/703* (2013.01)

(52) U.S. Cl.
CPC ............ *H04L 41/0668* (2013.01); *H04L 41/08* (2013.01); *H04L 45/22* (2013.01); *H04L 45/28* (2013.01)

(58) Field of Classification Search
CPC . H04L 41/06; H04L 41/0663; H04L 41/0654; H04L 41/08; H04L 43/0811; H04L 45/245; H04L 45/28; H04L 45/22; H04W 40/24
USPC .......................... 370/219, 252–258, 403–460
See application file for complete search history.

(56) References Cited

U.S. PATENT DOCUMENTS

| 8,125,926 | B1 | 2/2012 | Kompella | |
|---|---|---|---|---|
| 8,593,973 | B2* | 11/2013 | Shukla et al. | 370/241.1 |
| 8,644,134 | B2* | 2/2014 | Sajassi et al. | 370/224 |
| 8,811,181 | B2* | 8/2014 | Osswald | 370/236 |
| 2012/0147737 | A1* | 6/2012 | Taylor et al. | 370/219 |
| 2012/0236750 | A1* | 9/2012 | Bugenhagen et al. | 370/252 |
| 2014/0029419 | A1* | 1/2014 | Jain et al. | 370/228 |
| 2014/0241247 | A1* | 8/2014 | Kempf et al. | 370/328 |

* cited by examiner

*Primary Examiner* — Afsar M Qureshi
(74) *Attorney, Agent, or Firm* — Shumaker & Sieffert, P.A.

(57) ABSTRACT

In general, techniques are provided for receiving a first control plane message that indicates the reachability of the second PE network device as a designated forwarder in an Ethernet segment. The techniques include receiving a second control plane message comprising information that indicates, in the event of a network failure at the second PE router, that the third PE network device of the plurality of PE network devices is the designated forwarder in the layer two segment. The techniques also include forwarding layer two frames to the second PE network device identified as the designated forwarder in the layer two segment; and responsive to determining a network failure at the second PE network device, configuring, based at least in part on the second control plane message, a forwarding plane of the first PE network device to forward layer two frames to the third PE network device as the designated forwarder.

20 Claims, 5 Drawing Sheets

FAST FAILOVER IN MULTI-HOMED ETHERNET VIRTUAL PRIVATE NETWORKS

TECHNICAL FIELD

The disclosure relates to computer networks and, more particularly, to routing packets within computer networks.

BACKGROUND

A computer network is a collection of interconnected computing devices that can exchange data and share resources. Example network devices include layer two devices that operate within the second layer (L2) of the Open Systems Interconnection (OSI) reference model, i.e., the data link layer, and layer three devices that operate within the third layer (L3) of the OSI reference model, i.e., the network layer. Network devices within computer networks often include a control unit that provides control plane functionality for the network device and forwarding components for routing or switching data units.

An Ethernet Virtual Private Network (EVPN) may be used to extend two or more remote layer two (L2) customer networks through an intermediate layer three (L3) network (usually referred to as a provider network), in a transparent manner, i.e., as if the intermediate L3 network does not exist. In particular, the EVPN transports L2 communications, such as Ethernet packets or "frames," between customer networks via the intermediate network. In a typical configuration, provider edge (PE) network devices (e.g., routers and/or switches) coupled to the customer edge (CE) network devices of the customer networks define label switched paths (LSPs) (also referred to as pseudowires) within the provider network to carry encapsulated L2 communications as if these customer networks were directly attached to the same local area network (LAN). In some configurations, the PE network devices may also be connected by an IP infrastructure in which case IP/GRE tunneling or other IP tunneling can be used between the network devices.

As the PE network devices in an EVPN forward Ethernet frames, the PE network devices learn L2 state information for the L2 customer networks. The L2 state information may include media access control (MAC) addressing information for the CE network devices and customer equipment within the customer network and the physical ports of the PE network device through which the customer devices are reachable. The PE network devices typically store the MAC addressing information in L2 learning tables associated with each of their physical interfaces. When switching an individual Ethernet frame having a given destination MAC address, a PE network device typically broadcasts the Ethernet frame to all of its physical ports unless the PE network device has previously learned the specific physical port through which to the destination MAC address is reachable. In this case, the PE network device forwards a single copy of the Ethernet frame out the associated physical port.

In an EVPN, MAC learning between PE network devices occurs in the control plane rather than in the data plane (as happens with traditional bridging) using a routing protocol. For example, in EVPNs, a PE network device typically uses the Border Gateway Protocol (BGP) (i.e., an L3 routing protocol) to advertise to other provider edge network devices the MAC addresses learned from the local consumer edge network devices to which the PE network device is connected. A PE device may use BGP route advertisement message to announce reachability information for the EVPN, where the BGP route advertisement specifies one or more MAC addresses learned by the PE network device instead of L3 routing information.

In an EVPN configuration referred to as single-active mode, an Ethernet segment includes multiple PE network devices that provide multi-homed connectivity for one or more local customer network devices. Moreover, the multiple PE network device provide transport services through the intermediate network to a remote PE network device, and one of the multiple PE network devices in the Ethernet segment operates as a designated forwarder to forward Ethernet frames in the segment for the customer network device. The remaining PE network devices that provide the customer network device multi-homed connectivity in the Ethernet segment are configured as backup PE network devices. When a network failure occurs with respect to the current designated forwarder, the backup PE network devices may execute a designated forwarder election algorithm to determine which of the backup PE network devices will become the new designated forwarder and, as a result, assume responsibility for forward network layer two communications for the customer network device. During the time required to complete the designated forwarder election, the remote PE network device update routing and forwarding information maintained by the remote PE network device, including flushing MAC addresses learned for the Ethernet segment. As a result, the remote PE device may start flooding Ethernet frames through the intermediate network to all of the backup PE network devices in the Ethernet segment in an attempt to reach the customer network device. Consequently, network failures in an Ethernet segment may results in a large amount of flooding until the remote PE network device receives an indication of the next designated forwarder elected by the remaining PE network devices in the multi-homed topology.

SUMMARY

The techniques described herein are directed to providing fast failover at a remote PE network device between multiple PE network devices that provide single-active, multi-homed connectivity within an Ethernet segment. Generally, the Ethernet segment may include one or more EVPN instances (EVIs), that each represents a different virtual layer two network with separate forwarding domains. In some cases, an EVI may be associated with more than two PE routers within an Ethernet segment that are providing multi-homed connectivity to a local customer network device. The PE routers providing the multi-homed connectivity in the Ethernet segment may be operating in single-active mode for each the EVIs such that, for any given one of the EVIs, only one of the PE routers is configured as a "designated forwarder" that forwards Ethernet frames in the Ethernet segment for the customer network device while the remaining PE routers for the EVI are configured as backup PE routers. In accordance with techniques of the disclosure, rather than performing the designated forwarder election process for a given EVI in response to a network failure, the PE routers proving the multi-homed connectivity for the Ethernet segment determine an ordering of the PE routers as designated forwarders for each of the EVIs of the Ethernet segment prior to the network failure or other event the would require a change to the designated forwarder. In this way, any remote PE router associated with a given EVI, upon receiving an indication of the ordering in advance, may be configured to automatically update forwarding next hops associated with the EVI to efficiently switch to use of the next designated forwarder in response to a network failure or other event.

As one example, at initial startup and configuration of the the Ethernet segment, each of the local PE routers that provide the multi-homed connectivity for the customer network devices may be configured to perform a similar designated forwarder election algorithm so as to determine a particular sequence of designated forwarders for each of the EVIs of the Ethernet segment given failure of each PE router within the sequence. That is, each of the PE routers providing the multi-homed connectivity for the Ethernet segment executes the designated forwarded election algorithm to determine which of the PE routers in the Ethernet segment is to become the designated forwarder for each of the EVIs of the Ethernet segment in the event any given one of the PE routers fails. As one example, a first one of the PE routers providing the multi-homed connectivity to the customer network device may determine that it will initially operate as the designated forwarder for a given one of the EVIs and, as a result, send information indicating its designated forwarder status to any remote PE router participating within the EVI. In addition, a second PE router locally providing multi-homed connectivity to the customer edge device may determine that it will operate as the designated forwarder for the given EVI in the event the first PE router experiences a network failure. As a result, the second PE router may also send the remote PE routers information indicating its status as the next designated forwarder for the given EVI in the event the first PE router fails. Moreover, each of the multi-homed routers of the Ethernet segment similarly determines a primary and backup designated forwarder for each of the EVIs of the Ethernet segment.

The remote PE routers may use the respective statuses to pre-configure its forwarding information, for the EVI, in advance of a network failure by designating the first PE router as the current designated forwarder and the second PE router as the next designated forwarder in the event a network failure occurs with respect to the first PE router. At a later time, in the event the remote PE router determines that a network failure has occurred with respect to the first PE router, the remote PE router automatically updates its forwarding next hops to the second PE router for MAC routes previously corresponding to the first PE router in the EVI. That is, the remote PE router does not need to wait for the backup PE routers in the EVI to perform a designated forwarder election in response to the network failure or flood Ethernet frames to all backup PE routers because the remote PE router already configured its routing information based on the next designated forwarder status previously received from the second PE router. That is the remote PE router may not flush its MAC routes for the EVI but instead updates its forwarding next hops to the next designated forwarder based on the routing information.

In one example, a method includes receiving, by a first provider edge (PE) network device and from a second PE network device of a plurality of PE network devices that provide an active-standby configuration for an Ethernet segment coupling the plurality of PE network devices to a customer network, a first control plane message that indicates the reachability of the second PE network device as a designated forwarder in the Ethernet segment. The method also includes receiving, by the first PE network device and from a third PE network device of the plurality of PE network devices, a second control plane message comprising information that indicates, in the event of a network failure at the second PE router identified as the designated forwarder of the layer two segment, that the third PE network device of the plurality of PE network devices is the designated forwarder in the layer two segment. The method also includes forwarding, by the first PE network device, layer two frames to the second PE network device identified as the designated forwarder in the layer two segment. The method also includes responsive to determining a network failure at the second PE network device, configuring, by the first PE network device and based at least in part on the information of the second control plane message, a forwarding plane of the first PE network device to forward layer two frames to the third PE network device as the designated forwarder.

In one example, a network device is a first provider edge (PE) network device, and the network device comprises an EVPN module that receives, by the first provider edge (PE) network device and from a second PE network device of a plurality of PE network devices that provide an active-standby configuration for an Ethernet segment coupling the plurality of PE network devices to a customer network, a first control plane message that indicates the reachability of the second PE network device as a designated forwarder in the Ethernet segment. In some examples, the EVPN module receives, by the first PE network device and from a third PE network device of the plurality of PE network devices, a second control plane message comprising information that indicates, in the event of a network failure at the second PE router identified as the designated forwarder of the layer two segment, that the third PE network device of the plurality of PE network devices is the designated forwarder in the layer two segment. In some examples, the network device includes a forwarding plane that forwards, by the first PE network device, layer two frames to the second PE network device identified as the designated forwarder in the layer two segment. In some examples, the EVPN module, responsive to determining a network failure at the second PE network device, configures, by the first PE network device and based at least in part on the information of the second control plane message, a forwarding plane of the first PE network device to forward layer two frames to the third PE network device as the designated forwarder.

In one example, a method includes sending, to a first provider edge (PE) network device and from a second PE network device of a plurality of PE network devices that provide an active-standby configuration for an Ethernet segment coupling the plurality of PE network devices to a customer network, a first control plane message that indicates the reachability of the second PE network device as a designated forwarder in the Ethernet segment. The method also includes sending, by a third PE network device of the plurality of PE network devices and to the first PE network device, a second control plane message comprising information that indicates, in the event of a network failure at the second PE router identified as the designated forwarder of the layer two segment, that the third PE network device of the plurality of PE network devices is the designated forwarder in the layer two segment. The method also includes forwarding, by the first PE network device, layer two frames to the second PE network device identified as the designated forwarder in the layer two segment; and responsive to determining a network failure at the second PE network device, configuring, by the first PE network device and based at least in part on the information of the second control plane message, a forwarding plane of the first PE network device to forward layer two frames to the third PE network device as the designated forwarder.

In one example, network system includes a network that includes: a first provider edge (PE) network device; second and third PE network devices that provide an active-standby configuration for an Ethernet segment coupling the second and third provider PE network devices to a customer network. In some examples, the second PE network device comprises a first control plane that sends, to the first provider edge (PE)

network device, a first control plane message that indicates the reachability of the second PE network device as a designated forwarder in the Ethernet segment. In some examples, the third PE network device comprises a second control plane that sends, to the first PE network device, a second control plane message comprising information that indicates, in the event of a network failure at the second PE router identified as the designated forwarder of the layer two segment, that the third PE network device of the plurality of PE network devices is the designated forwarder in the layer two segment. In some examples, the first PE network device comprises a forwarding plane that forwards layer two frames to the second PE network device identified as the designated forwarder in the layer two segment. In some examples, the first PE network device comprises a control plane that, responsive to determining a network failure at the second PE network device, configures, based at least in part on the information of the second control plane message, the forwarding plane of the first PE network device to forward layer two frames to the third PE network device as the designated forwarder.

The details of one or more embodiments of the disclosure are set forth in the accompanying drawings and the description below. Other features, objects, and advantages of the disclosure will be apparent from the description and drawings, and from the claims.

DETAILED DESCRIPTION

Figure 1:
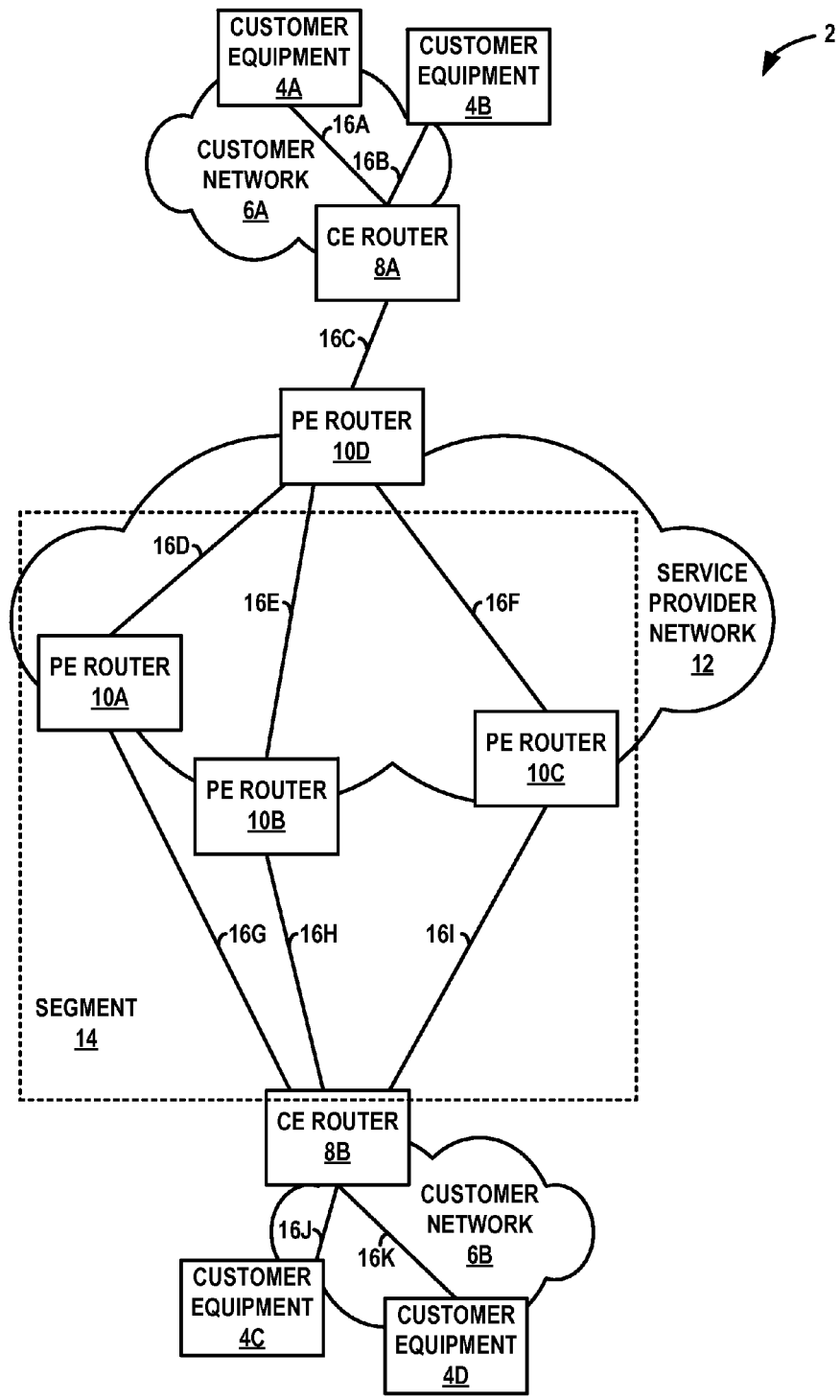
FIG. 1 is a block diagram illustrating an example system in which a first provider edge (PE) router advertises to a second, remote PE router, in advance of a network failure, that the first PE router is the next designated forwarder, in accordance with techniques of the disclosure.

FIG. 1 is a block diagram illustrating an example system in which a first provider edge (PE) router advertises to a second, remote PE router, in advance of a network failure, that the first PE router is the next designated forwarder, in accordance with techniques of the disclosure. In the example of FIG. 1, PE routers 10A-10D ("PE routers 10") provide customer devices 4A-4D ("customer devices 4") associated with customer networks 6A-6B ("customer networks 6") with access to service provider network 12 via CE routers 8A-8B ("CE routers 8"). Network links 16A-16I may be Ethernet, ATM or any other suitable network connections.

PE routers 8 and CE routers 10 are illustrated as routers in the example of FIG. 1; however, techniques of the disclosure may be implemented using switches or other suitable network devices. Customer networks 6 may be networks for geographically separated sites of an enterprise. Each of customer networks 6 may include additional customer equipment 4A-4D ("customer equipment 4"), such as, one or more non-edge switches, routers, hubs, gateways, security devices such as firewalls, intrusion detection, and/or intrusion prevention devices, servers, computer terminals, laptops, printers, databases, wireless mobile devices such as cellular phones or personal digital assistants, wireless access points, bridges, cable modems, application accelerators, or other network devices. The configuration of network 2 illustrated in FIG. 1 is merely exemplary. For example, an enterprise may include any number of customer networks 6. Nonetheless, for ease of description, only customer networks 6A-6B are illustrated in FIG. 1.

Service provider network 12 represents a publicly accessible computer network that is owned and operated by a service provider, which is usually large telecommunications entity or corporation. Service provider network 12 is usually a large layer three (L3) computer network, where reference to a layer followed by a number refers to a corresponding layer in the Open Systems Interconnection (OSI) model. Service provider network 12 is a L3 network in the sense that it natively supports L3 operations as described in the OSI model. Common L3 operations include those performed in accordance with L3 protocols, such as the Internet protocol (IP). L3 is also known as a "network layer" in the OSI model and the term L3 may be used interchangeably with the phrase "network layer" throughout this disclosure.

Although not illustrated, service provider network 12 may be coupled to one or more networks administered by other providers, and may thus form part of a large-scale public network infrastructure, e.g., the Internet. Consequently, customer networks 6 may be viewed as edge networks of the Internet. Service provider network 12 may provide computing devices within customer networks 6 with access to the Internet, and may allow the computing devices within the customer networks to communicate with each other. Service provider network 12 may include a variety of network devices other than PE routers 10. Although additional network devices are not shown for ease of explanation, it should be understood that system 2 may comprise additional network and/or computing devices such as, for example, one or more additional switches, routers, hubs, gateways, security devices such as firewalls, intrusion detection, and/or intrusion prevention devices, servers, computer terminals, laptops, printers, databases, wireless mobile devices such as cellular phones or personal digital assistants, wireless access points, bridges, cable modems, application accelerators, or other network devices. Moreover, although the elements of system 2 are illustrated as being directly coupled, it should be understood that one or more additional network elements may be included along any of network links 16, such that the network elements of system 2 are not directly coupled.

Service provider network 12 typically provides a number of residential and business services, including residential and business class data services (which are often referred to as "Internet services" in that these data services permit access to the collection of publically accessible networks referred to as the Internet), residential and business class telephone and/or voice services, and residential and business class television services. One such business class data service offered by service provider network 12 includes Ethernet Virtual Private Network (EVPN). EVPN is a service that provides a form of L2 connectivity across an intermediate network, such as service provider network 12, to interconnect two L2 customer networks, such as L2 customer networks 6, that are usually located in two different geographic areas. Often, EVPN is transparent to the customer networks in that these customer networks are not aware of the intervening intermediate service provider network and instead act and operate as if these two customer networks were directly connected. In a way, EVPN enables a form of a transparent LAN connection between two geographically distant customer sites that each operates a L2 network and, for this reason, EVPN may also be referred to as a "transparent LAN service."

To configure an EVPN, a network operator of the service provider configures various devices included within service provider network 12 that interface with L2 customer networks 6. The EVPN configuration may include an EVPN instance (EVI), which consists of one or more broadcast domains. Generally, an EVI may refer to a routing and forwarding instance on a PE router. Consequently, multiple EVIs may be configured for Ethernet segment 14, as further described herein, each providing a separate, logical layer two (L2) forwarding domain. In this way, multiple EVIs may be configured that each includes one or more of PE routers 10A-10C of Ethernet segment 14. In some examples, Ethernet Tags are then used to identify a particular broadcast domain, e.g., a VLAN, in an EVI. A PE router may advertise a unique EVPN label per <ESI, Ethernet Tag> combination. This label assignment methodology is referred to as a per <ESI, Ethernet Tag> label assignment. Alternatively, a PE router may advertise a unique EVPN label per MAC address. In still another example, a PE router may advertise the same single EVPN label for all MAC addresses in a given EVI. This label assignment methodology is referred to as a per EVI label assignment.

In the example of FIG. 1, for use in transporting communications associated with one or more EVIs, the network operator configures each of PE routers 10 to provision what may be referred to as "pseudowires" and commonly abbreviated as "PWs." Although not shown in FIG. 1, EVPN may operate over such pseudowires to enable a logical form of L2 connectivity. Pseudowires are logical network connections formed from two unidirectional label switched paths (LSPs) that emulate a connection not natively offered by service provider network 12 for consumption outside the boundaries of that service provider network 12. Pseudowires may emulate a L2 connection within service provider network 12 enabling service provider network 12 to offer emulated L2 connectivity externally for consumption by L2 customer networks 6.

To configure an EVI, pseudowires may be configured such that each of PE routers 10 that provide EVPN for consumption by the subscribing entity is interconnected by way of pseudowires to every other one of the PE devices that provide EVPN for consumption by the subscribing entity. In the example of FIG. 1, each of PE routers 10 provides access to the EVPN for carrying traffic associated with customer networks 6 and, therefore, each of PE devices 10 within the same Ethernet segment may be connected to every other PE device 10 via pseudowires. Once pseudowires are configured in this manner, EVPN may be enabled within PE devices 10 to operate over the pseudowires, which may in this context operate as logical dedicated links through service provider network 12. In operation, EVPN generally involves prepending or otherwise inserting a tag and a pseudowire lable onto incoming L2 packets, which may also be referred to as L2 frames (particularly in the context of Ethernet), and transmitting the tagged packets through a corresponding one of the configured pseudowires. Once EVPN is configured within service provider network 12, customer devices 4 within customer networks 6 may communicate with one another via EVPN as if they were directly connected L2 networks.

In the example of FIG. 1, when providing the EVPN service to customer networks 6, PE routers 10 and CE routers 8 typically perform MAC address learning to efficiently forward L2 network communications in system 2. That is, as PE routers 10 and CE routers 8 forward Ethernet frames, the routers learn L2 state information for the L2 network, including media access control (MAC) addressing information for customer equipment 4 within the network and the physical ports through which customer equipment 4 are reachable. PE routers 10 and CE routers 8 typically store the MAC addressing information in MAC tables associated with respective interfaces. When forwarding an individual Ethernet frame received on one interface, a router typically broadcasts the Ethernet frame to all other interfaces associated with the EVPN unless the router has previously learned the specific interface through which the destination MAC address specified in the Ethernet frame is reachable. In this case, the router forwards a single copy of the Ethernet frame out the associated interface.

Moreover, as PE routers 10 learn the MAC address for customer equipment 4 reachable through local attachment circuits, the PE routers 10 utilize route advertisements of a layer three (L3) routing protocol (i.e., BGP in this example) to share the learned MAC addresses and to provide an indication that the MAC addresses are reachable through the particular PE router that is issuing the route advertisement. In the EVPN implemented using PE routers 10 for a given EVI, each of PE routers 10 advertises the locally learned MAC addresses to other PE routers 10 using a BGP route advertisement, also referred to herein as a "MAC route" or a "MAC Advertisement route." As further described below, a MAC route typically specifies an individual MAC address of customer equipment 4 along with additional forwarding information, such as a route descriptor, route target, layer 2 segment identifier, MPLS label, etc. In this way, PE routers 10 use BGP to advertise and share the MAC addresses learned when forwarding layer two communications associated with the EVPN.

In this way, PE routers 10 may perform both local learning and remote learning of MAC addresses. Each of PE routers 10 (e.g., PE router 10C) utilizes MAC routes specifying the MAC addresses learned by other PE routers to determine how to forward L2 communications to MAC addresses that belong customer equipment 4 connected to other PEs, i.e., to remote CE routers and/or customer equipment behind CE routers operatively coupled to PE routers. That is, each of PE routers 10 determine whether Ethernet frames can be sent directly to a particular one of the other PE routers 10 or whether to treat the Ethernet frames as so called "BUM" traffic (Broadcast, Unidentified Unicast or Multicast traffic) that is to be flooded within the EVPN based on the MAC addresses learning information received from the other PE routers.

As shown in FIG. 1, CE routers 8 may be multi- and/or singly-homed to one or more of PE routers 10. In EVPN, a CE router may be said to be multi-homed when it is coupled to two physically different PE routers on the same EVI when the PE routers are resident on the same physical Ethernet Segment. As one example, CE router 8B is coupled to PE routers 10A, 10B, 10C via links 16G, 16H, and 16I, respectively, where PE routers 10A, 10B, and 10C are capable of providing access to EVPN for L2 customer network 6B via CE router 8B. In instances where a given customer network (such as customer network 6B) may couple to service provider network 12 via two different and, to a certain extent, redundant links, the customer network may be referred to as being "multi-homed." In this example, CE router 8B may be multi-homed to PE routers 10A, 10B, and 10C because CE router 8B is coupled to three different PE routers 10A, 10B, and 10C via separate and, to a certain extent, redundant links 16G, 16H, and 16I, where both of PE routers 10A, 10B, and 10C are capable of providing access to EVPN for L2 customer network 6B. Multi-homed networks are often employed by network operators so as to improve access to EVPN provided by service provider network 12 should a failure in one of links 16G, 16H, 16I occur.

As shown in FIG. 1, A CE and/or PE network device, such as CE router 8B or PE router 10C may be multi-homed to two or more PE network devices that collectively comprise an "Ethernet segment." For instance, in the example of FIG. 1, PE routers 10A-10D are included in Ethernet segment 14. Moreover, physical links 16G, 16H and 16I of Ethernet segment 14 may appear to routing and forwarding functions within CE router 8B as a Link Aggregation Group (LAG), i.e., a single logical link. Ethernet segments have an identifier, called the "Ethernet Segment Identifier" (ESI), which may be encoded as a ten octets integer. In general, an Ethernet segment uses a non-reserved ESI that is unique network wide (e.g., across all EVPNs on all the PEs). In some examples, a network operator may manage ESIs throughout the EVPN to ensure unique network wide ESIs for respective Ethernet segments. In other examples, ESIs may be allocated automatically. In this example of FIG. 1, Ethernet segment 14 includes PE routers 10A-10C and CE router 8B, and Ethernet segment 14 may be associated with a unique ESI. As described above, one or more EVIs may be configured for a single Ethernet segment. That is, multiple EVIs may be configured for Ethernet segment 14 and each respective EVI may include one or more of PE routers 10A-10C.

Using ESIs, PE routers 10 may share learned MAC addresses by sending MAC Advertisement routes that specify, among other information, a learned MAC address and a corresponding ESI. In this way, PE routers may maintain tables of MAC addresses associated with corresponding ESIs. Consequently, a PE router that receives and maintains MAC addresses that were previously learned by other PE routers can determine that a MAC route is accessible through multiple PE routers that are associated with the same ESI.

As described above, PE routers 10 may use control plane signaling with different route types to provision the EVPN service in service provider network 12. EVPN defines BGP Network Layer Reachability Information (NLRI), and in particular, defines different route types. The EVPN NLRI is carried in BGP using BGP Multiprotocol Extensions. Route types include but are not limited to: Ethernet Auto-Discovery (AD) routes, MAC advertisement routes, and Ethernet Segment Routes. AD routes, for example, specify a Route Distinguisher (RD) (e.g., an IP address of an MPLS Edge Switch (MES)), ESI, Ethernet Tag Identifier, and MPLS label. MAC advertisement routes include a RD, ESI, Ethernet Tag Identifier, MAC address and MAC address length, IP address and IP address length, and MPLS label. An Ethernet Segment route includes a Route Distinguisher and Ethernet Segment Identifier.

PE routers 10 may share NLRI to configure one or more Ethernet segments and share MAC routes that are learned by the respective devices. In general, PE routers connected to the same Ethernet segment can automatically discover each other with minimal to no configuration through the exchange of the Ethernet Segment route using BGP. In multi-homed environments EVPN defines a mechanism to signal, to remote PE routers, the need to update their forwarding tables upon the occurrence of a failure in connectivity to an Ethernet segment. This is done by having each PE router advertise an Ethernet AD Route per Ethernet segment for each locally attached segment. Upon a failure in connectivity to the attached segment, the PE router withdraws the corresponding Ethernet AD route by sending an AD route withdrawal message to other PE routers. This triggers all PE routers that receive the withdrawal to update their next-hop adjacencies for all MAC addresses associated with the Ethernet segment specified by the Ethernet AD route. If no other PE routers had advertised an Ethernet AD route for the same segment, then the PE router that received the withdrawal simply invalidates the MAC entries for that segment.

In some examples, PE routers 10A-10C may operate in "active-active mode" or "single-active mode" when forwarding network packets between PE router 10D and CE router 8B. In active-active mode (or "all-active" mode), PE routers 10A-10C each operate concurrently to forward traffic between CE router 8B and PE router 10D for a given EVI. In one example of active-active mode, all of PE routers 10A-10C in such a redundancy group can forward traffic to/from PE router 10D for a given EVI. By contrast, in single-active mode (or "active/standby" mode), when CE router 8B is multi-homed to two or more PE routers, such as PE routers 10A-10C, only a single PE router in such a redundancy group forwards traffic for the CE router to/from remote PE router 10D for a given EVI.

In active-active mode, EVPN also provides configuration for "aliasing." Aliasing refers to the ability of a PE router to signal that it has reachability to a given locally attached Ethernet segment, even when it has learned no MAC addresses from that segment. An Ethernet AD route, which includes an ESI for an Ethernet segment, may be used to signal this configuration of a PE router. Remote PE routers which receive MAC advertisement routes with non-reserved ESI may consider an advertised MAC address as reachable via all PE routers which have advertised reachability to the relevant Ethernet segment. A remote PE router may generally refer to a PE router not included in an Ethernet segment and/or EVI. As one example of aliasing in active-active mode, PE router 10A may advertise an Ethernet AD route to PE router 10D. Using aliasing, PE router 10D would, in response to receiving the Ethernet AD route, forward traffic to PE routers 10B-10C as well as PE router 10A because PE routers 10B-10C are in the same EVI of Ethernet segment 14.

In single-active operation of an EVPN, PE routers 10A-10C participating local Ethernet segment 14 operate to elect a designated forwarder for a given EVI. More specifically, in the case of an EVI configured in single-active mode of a multi-homed environment, one of PE routers 10A-10C is configured as a designated forwarder in the EVI and the remaining PE routers of PE routers 10A-10C are configured as non-designated forwarder devices (or "backup devices"). Generally, a designated forwarder of an EVI is responsible for forwarding traffic associated with the Ethernet segment. For instance, PE router 10A may be configured as the designated forwarder to send traffic between PE router 10D and CE router 8B via Ethernet Segment 14. PE routers 10B-10C are configured as backup devices that do not send network traffic from PE router 10D to CE router 8B because PE router 10A is configured as the designated forwarded. In addition, the designated forwarder is responsible for sending multicast and broadcast traffic, on a given Ethernet Tag on a particular Ethernet segment, to a CE router. A designated forwarder may also be responsible for flooding unknown unicast traffic (i.e. traffic having a destination MAC address that a PE router has not previously learned and associated with a particular interface), on a given Ethernet Tag on a particular Ethernet segment to the CE router, if the environment requires flooding of unknown unicast traffic. In such configurations, a CE router sends packets belonging to a specific flow using a single link towards a PE router. For instance, if the CE router is a host, the host treats the multiple links that it uses to reach the PE routers as a Link Aggregation Group (LAG). The CE router may employ a local hashing function to map traffic flows onto links in the LAG.

During operation, the designated forwarder of an active-standby Ethernet segment learns MAC addresses when forwarding traffic for the Ethernet segment and shares the MAC addresses with any remote PE via exchange of routing advertising announcing MAC routes. For example, as the designator forwarder for Ethernet segment 14, PE router 14A learns MAC addresses for customer equipment 4C, 4D when forwarding traffic for the Ethernet segment and shares the MAC addresses with PE router 10D via announcing MAC routes. PE router 14, upon receiving the MAC routes, In the current EVPN specification ("BGP MPLS Based Ethernet VP", draft-ietf-l2vpn-evpn-03, Feb. 25, 2013), PE routers that are not on the same Ethernet segment (e.g., remote PE routers) as a PE router advertising itself as the designated forwarder, have no knowledge of the designated forwarder determination that takes place between the advertising PE router and other PE routers which share the same segment as the advertising PE router. In a single-active multi-homed case, when there are exactly two PE routers multi-homed to the same segment, a remote PE router knows that when the advertising PE router crashes or its attached Ethernet Segment is down, that the other backup PE router will become the new active PE router. In such instances, the remote PE router can switch the next hops of all MAC routes learned from the advertising PE router (the one that has gone down) to the backup PE router.

However, in case of more than two PE routers provide multi-homed connectivity for the same Ethernet segment under the current EVPN specification ("BGP MPLS Based Ethernet VP", draft-ietf-l2vpn-evpn-03, Feb. 25, 2013), when the designated forwarder goes down or the Ethernet segment that it is attached to goes down, the remaining backup PE routers must run the designated forwarder election again and elect a new active PE router amongst themselves. The outcome of such an election, though, is not known in advance to the remote PE routers. Consequently, all Ethernet frames that are in transit will be flooded but only the PE router that was newly elected as such will forward the Ethernet frames to the CE. Until the outcome of the designated forwarder election and the newly active PE router assumes its role as designated forwarder, there may be loss of frames, and also flooding until the MAC routes are advertised from the new designated forwarder to the remote PE routers.

Techniques of the present disclosure may reduce such losses of frames and/or flooding when more than two PE routers are multi-homed to the same Ethernet segment, by determining upfront, and prior to a network failure, which one of the backup PE routers would become the designated forwarder in case the current designated forwarder fails. Techniques of the disclosure may determine the designated forwarder on a per-EVI basis, such that in the case of multiple EVIs, a PE router in an Ethernet segment may be the designated forwarder Prior to a network failure, for a given EVI one or more of the backup PE routers included in the Ethernet segment may then communicate to the remote PE router which one of the backup PE routers becomes the new designated forwarder in the event that the current designated forwarder experiences a link failure or other impediment to network communication. Such techniques of the disclosure may be performed for PE routers in each EVI.

In accordance with techniques of the disclosure, one of the PE routers in an Ethernet segment may be configured as the designated forwarder while the other PE routers are configured as backup devices. As further described in FIG. 2, every PE router for a given EVI and attached to a given Ethernet segment that is operating in single-active mode runs a designated forwarder election algorithm resulting in a determination of which PE router is the designated forwarder for an Ethernet segment. For each EVI, the PE routers may also run the designated forwarder election algorithm multiple additional times, each time removing one of the PE routers attached to the Ethernet segment from the designated forwarder election. Each of these designated forwarder elections determines how the designated forwarded election results would change if the PE router that was removed should fail. For the Ethernet segment, each respective backup PE router checks whether it would be the designated forwarder if the PE router that is initially the designated forwarder for that Ethernet segment fails. If the backup PE router would be the designated forwarder for the given EVI, it advertises an Ethernet AD route for that Ethernet segment to the remote PE routers. The Ethernet AD route indicating that the backup PE router would be the designated forwarder may be formatted the same as a route advertisement used to signal aliasing (or active-active mode) as described above and may be referred to as an "optional route;" however, the Ethernet AD route may include different values. For instance, the "optional route" may include a VLAN tag that is not equal to zero and/or an MLPS label, neither of which may be included in an Ethernet AD route sent by a designated forwarder in single-active mode for a given EVI. That is, the control plane message including the optional route is formatted for control plane signaling in an active-active mode environment, although the message is being used in single-active mode in accordance with techniques of the disclosure. In this way, the remote PE router determines based on the Ethernet AD route that the Ethernet segment is configured in single-active mode for the given EVI, but that the backup PE router is the next designated forwarder if the current designated forwarder fails. Consequently, techniques of the disclosure may use an existing route format in EVPN to indicate in advance which backup PE router of an Ethernet segment is to be the next designated forwarder in the event that the current designated forwarder fails.

A remote PE router that receives such an Ethernet AD route from a backup PE router considers a MAC address for that EVI as reachable in the Ethernet segment via the backup PE router should the designated forwarder that advertised the MAC Advertisement route for that MAC address fail. This optimization therefore provides for a precomputation of the next hops at the remote PE router in the event of a link failure. If the remote PE router determines that a link failure has occurred at the current designated forwarder, the next hops for MAC routes would immediately switch to the backup PE router from where the Ethernet AD route (e.g., "optional route") was previously learnt. Such techniques may reduce the traffic loss and flooding because rather than flooding Ethernet frames until the backup PE routers have completed the designated forwarder algorithm, the remote PE router has already received information that indicates the next PE router that will become the designated forwarder in the event of a link failure. Techniques of the disclosure therefore use an AD Ethernet Route in single-active mode to indicate in advance the next designated forwarder in a multi-homed environment.

In operation, referring to FIG. 1, PE router 10D may be a remote PE router relative to PE routers 10A-10C and Ethernet segment 14. At configuration and startup, PE routers 10A-

10C each repeatedly run a designated forwarder election algorithm, each time removing one of the routers from the set of available routers. Each of PE routers 10A-10C may exchange one or more control plane messages to identify PE routers included in Ethernet segment 14. Based on information associated with PE routers in Ethernet segment 14, each of PE routers 10A-10C determines the ordering of PE routers that become the designated forwarder in the event of a network failure for each EVI configured in Ethernet segment 14. In the example of FIG. 1, PE router 10A is initially determined to be the designated forwarder for a given EVI. Moreover, PE routers 10A-10C determine that PE router 10B will be the new designated forwarder for the EVI in the event that PE router 10A. In addition, PE routers 10A-10C determine that PE router 10C will be the designated forwarder in the event both PE routers 10A and 10B fail.

PE router 10A, having determined that it is the designated forwarder initially for the EVI, sends an Ethernet AD route to PE router 10D using BGP or any other suitable L3 protocol to indicate that PE router 10A is the designated forwarder. The Ethernet AD route sent by PE router 10A, i.e., the designated forwarder may be referred to as the "mandatory route." In some examples, the other PE routers also send initial Ethernet AD route advertisements to PE router 10D. In accordance with techniques of the disclosure, PE router 10B, after running the same designated forwarder election algorithm, determines that it is the next designated forwarder for the EVI if PE router 10A fails. Consequently, PE router 10B sends an Ethernet AD route to PE router 10D using BGP or any other suitable L3 protocol to indicate that PE router 10B is the next designated forwarder for the EVI if PE router 10A fails. The Ethernet route sent by PE router 10B, i.e., the backup designated forwarder may be referred to as the "optional route." In some examples, PE router 10B, after sending its initial Ethernet AD route advertisement at configuration and startup, sends a subsequent Ethernet AD route as the "optional route" to indicate its status as the backup designated forwarder for the EVI. Consequently, PE router 10D is able to determine that, for the EVI, PE router 10B is the next designated forwarder in the event that PE router 10A fails based on information included in the Ethernet AD route. PE router 10D may therefore update its forwarding information to indicate that the forwarding next hops for MAC routes which currently use PE router 10A may be updated to PE router 10B if a network failure occurs.

At a later time, PE router 10D may determine that a network failure has occurred with respect to PE router 10A. For instance, PE router 10A may fail or a network link that operatively couples PE router 10A to CE router 8B and/or PE router 10D may fail. If, for example, network link 16G failed, PE router 10A may send PE router 10D an Ethernet AD route withdrawal advertisement using any suitable L3 protocol. Upon receiving the withdrawal advertisement, PE router 10D can automatically update forwarding next hops for MAC routes associated with an Ethernet segment indicated in the Ethernet AD route withdrawal advertisement. PE router 10D, in the current example of FIG. 1, updates the forwarding next hops for the MAC routes to PE router 10B. That is, rather than flushing all MAC address for the given EVI associated with the Ethernet segment 14, flooding Ethernet frames to all of PE routers 10B-10C in response to the link failure, waiting for PE routers 10B-10C to determine the next designated forwarder, and waiting for subsequent MAC routes from the newly elected designated forwarder, router 10D continues to use its current forwarding information, including MAC addresses for the EVI of Ethernet segment 14, based on the Ethernet AD route previously sent by PE router 10B before the network failure. That is, router 10D considers the MAC addresses previously learned from failed router 10A to be reachable via router 10B since router 10B has pre-sent an AD Ethernet Route for the given EVI of Ethernet segment 14, thereby indicating that router 10B was preselected to be a designated forwarder for Ethernet segment 14 in the event router 10A failed. Instead of flushing all MAC addresses for the Ethernet segment, router 10D may update next hop forwarding information for the Ethernet segment to direct traffic to router 10B. Consequently, PE router 10D may use PE router 10B to forward Ethernet frames destined for CE router 8B in Ethernet segment 14.

Figure 2:
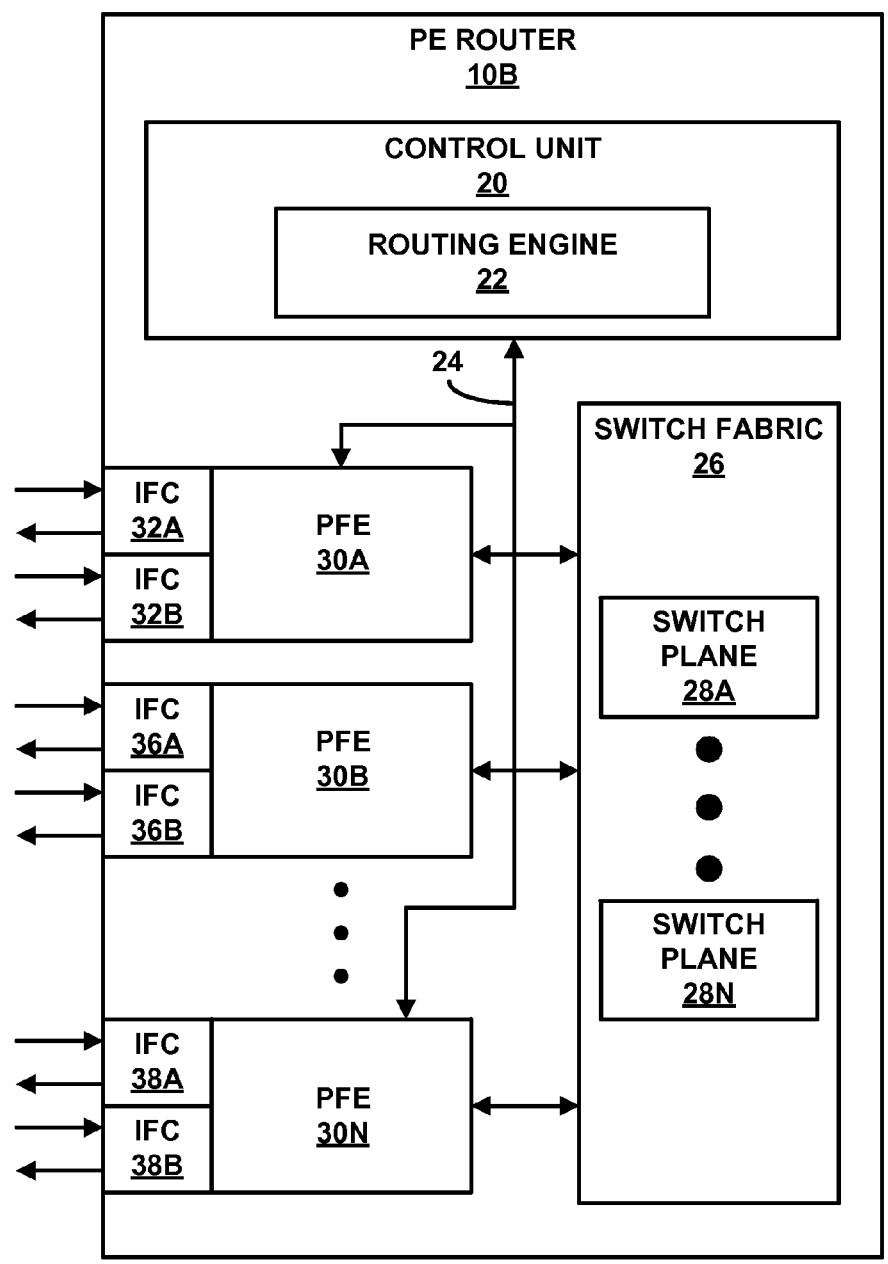
FIG. 2 is a block diagram illustrating the example PE router of FIG. 1 in greater detail, in accordance with techniques of the disclosure.

FIG. 2 is a block diagram illustrating example PE router 10C of FIG. 1 in greater detail, in accordance with techniques of the disclosure. PE router 10C includes control unit 20, switch fabric 26, and PFEs 30A-30N ("PFEs 30"), capable of implementing techniques of the disclosure. PFEs 30 may receive and send data via interface cards 32A-32B, 36A-36B, and 38A-38B ("IFCs 32", "IFCs 36", and "IFCs 38", respectively). In other embodiments, each of PFEs 30 may comprise more or fewer IFCs. Switch fabric 26 provides an interconnect mechanism for forwarding data between PFEs 30 for transmission over a network, e.g., the Internet.

Routing engine 22 maintains routing tables, executes routing protocol and controls user access to PE router 10C. In this example, routing engine 22 is connected to each of PFEs 30 by a dedicated link 24, which may be an internal Ethernet link. For example, dedicated link 24 may comprise a 100 Mbps Ethernet connection. Routing engine 22 maintains routing information that describes a topology of a network, and derives a forwarding information base (FIB) in accordance with the routing information. Routing engine 22 copies the FIB to each of PFEs 30. This allows the FIB in each of PFEs 30 to be updated without degrading packet forwarding performance of PE router 10C. Alternatively, routing engine 22 may derive separate FIBs which are copied to respective PFEs 30.

Control unit 20 provides an environment for storing L2 network topology information, e.g., spanning tree information, executing CFM protocols to provide fault isolation and detection over large L2 networks, and providing a management interface to allow user access and configuration of PE router 10C. The operating environment of control unit 20 may be implemented solely in software, or hardware, or may be implemented as a combination of software, hardware or firmware. For example, control unit 20 may include one or more processors which execute software instructions. In that case, control unit 20 may include various software modules or daemons, and may include a computer-readable storage medium, such as computer memory or hard disk, for storing executable instructions.

In a routing node, a "switch plane" is generally capable of providing a communication path between any two of PFEs 30. In this example, switch fabric 26 consists of multiple standalone switch planes 28A through 28N ("switch planes 28"). In some embodiments, each of switch planes 28 is provided by one or more switch fabric chips on one or more separate, removable switch cards. Other routing nodes that implement the techniques described herein may comprise additional or fewer switch planes, including a single switch plane. A majority of the switch planes may be active at any given time with data packets distributed over the active switch planes. The inactive switch plane(s) of switch fabric 26 serves as back-up switch plane(s) such that if one or more of the active switch planes goes offline, the back-up switch plane(s) automatically activate, and the bandwidth capacity of PE router 10C is not diminished. The back-up switch plane(s)

may be identical to the active switch planes and act as hot spare(s) to maintain bandwidth capacity in the event that one or more of the active switch planes fail. Each of switch planes 28 is operationally independent; therefore, PE router 10C may continue to forward packets as long as at least one of switch planes 28 remain active, but possibly at a reduced bandwidth capacity.

As part of a standalone router, switch planes 28 form a standalone switch fabric 26. That is, each of switch planes 28 is capable of providing a connection between any of PFEs 30 within PE router 10C. In this manner, switch planes 28 form a standalone switch fabric that enables packet forwarding between the plurality of PFEs 30 of PE router 10C. For example, switch fabric 26 may be provided by a set of removable switch cards, where each removable switch card provides a respective one of switch planes 28.

As shown in FIG. 2, PFE 30A and PFE 30B may be ingress PFEs that receive network packets at one or more of interfaces 32A-32B and 36A-36B, respectively. Ingress PFEs 30A and 30B may route the network packets to PFE 30N, which may be an egress PFE. Consequently, egress PFE 30 may route network packets to other network devices via one or more of network interfaces 38A-38B.

In accordance with techniques of the disclosure, PE routers 10A-10C may, at configuration and startup, perform a designated forwarder election algorithm to determine an ordering (e.g., "designated forwarder ordering") with which PE routers 10A-10C become the designated forwarder for one or more EVIs of Ethernet segment 14 in the event of one or more failures. Each of PE routers 10A-10C perform the same designated forwarder algorithm to ensure that each of PE routers 10A-10C determine the same ordering. For instance, routing engine 22 may send one or more control plane messages to PE routers 10A-10C. Routing engine 22, in some examples, sends the control plane messages using a layer 3 protocol such as BGP. The control plane messages may request information from the other PE routers 10A, 10C, such as IP addresses associated with each of PE routers 10A, 10C. Moreover, PE router 10B and PE routers 10A, 10C may be a part of a common VLAN. Consequently, control plane messages sent and received between PE routers 10A-10C may have a common VLAN tag that corresponds to Ethernet segment 14. Routing engine 22 may receive control plane messages from each of PE routers 10A and 10C that indicate IP addresses of the respective PE routers. Examples information indicated in control plane messages may include, but are not limited to: Ethernet AD route advertisements, Ethernet AD route withdrawal advertisements, MAC route advertisements, and MAC route withdrawal advertisements.

Although described with respect to routing engine 22, each of PE routers 10A-10C in Ethernet segment 14 performs the designated forwarder algorithm. For one or more EVIs, routing engine 22 may determine respective orderings with which PE routers 10A-10C become the designated forwarder in the event of network failure based on identifying information of PE routers 10A-10C in Ethernet segment 14. For instance, routing engine 22 may use a hash function that takes as input, a value comprised of the IP address for a given PE router and the common VLAN tag. The output of the hash function may be a hashcode for the given PE router. Routing engine 22 may generate a set of hashcodes, one hash code for each respective PE router. Routing engine 22, in some examples may sort the set of hashcodes in an ordering (e.g., ascending or descending). Routing engine 22 may then determine the designated forwarder is, for example, the PE router associated with the hashcode that corresponds to the smallest index of the ordering. For instance, an ordering may have an index from 0 ... n. The smallest index of the ordering may therefore be 0.

For a given Ethernet segment, routing engine 22 may perform designated forwarder selection for each EVI. Each of these designate forwarder elections may be used to determine, by the PE router, the per-EVI designated forwarder election result if a given node should fail. That is, routing engine 22 may remove PE router 10B (e.g., to simulate a network failure in which PE router 10B is unable to forward network device) and determine, for each of the EVIs of the Ethernet segment, whether PE router 10A is the designated forwarder or backup designated forwarder. Routing engine 22 may then add back router 10B (i.e., simulate that router 10B is available) but remove PE router 10C and determine, for each of the EVIs of the Ethernet segment, whether PE router 10A would be the designated forwarder or backup designated forwarder. In this way, routing engine 22 performs such techniques to determine the primary and backup designated forwarder status for each EVI configured in the Ethernet segment within which routing engine 22 participates. In some examples, the designated forwarder election techniques distributes the role of designated forwarder for all of the EVIs on the Ethernet segment across all of the PE routers attached to it. So, if there were, for example, 300 EVIs on a given Ethernet segment and three PE routers attached to the Ethernet segment, each may be the designated forwarder for approximately 100 E-VPN instances. Thus, in some examples, each PE router may be the backup designated forwarder for roughly 100 E-VPN instances.

Routing engine 22 may perform the designated forwarder algorithm on different sets of hashcodes to simulate different designated forwarders experiencing network failures in order to determine which PE router is the next designated forwarder for each respective simulation. For instance, on a per-EVI basis, routing engine 22 may perform the designated forwarder algorithm to simulate that PE router 10A, the designated forwarder, experiences a network failure. Routing engine 22 may determine, based on the ordering of hashcodes corresponding to PE routers, that PE router 10B is the next designated forwarder. Routing engine 22 may also perform additional simulations based other combinations of PE routers experiencing network failures when operating as the designated forwarder for Ethernet segment 14. In this way, routing engine 22 may determine the ordering of PE routers as next designated forwarders for network failures at different PE routers. The ordering of PE router 10B, in some examples, matches the ordering of PE router 10A, such that each of PE routers 10A-10C determine the same ordering. Generally, a next designated forwarder may refer to a PE router that becomes the designated forwarder directly following a network failure at the PE router currently operating as the designated forwarder.

In the example of FIG. 2, PE router 10A may determine, upon performing the designated forwarder election process, that PE router 10A is initially the designated forwarder for a given EVI in Ethernet segment 14. Consequently, PE router 10A may send information to PE router 10D, e.g., a "mandatory route," that indicates PE router 10A is the designated forwarder for the EVI. In some examples, the information may be an Ethernet AD route advertisement that specifies, among other information, the Ethernet segment identifier and VLAN tag for Ethernet segment 14. The Ethernet AD route advertisement may further include an Extended Community attribute that can specify additional information. Further information about BGP Extended Community Attributes can be found in RFC 4360. In the example of FIG. 2, to indicate that PE router 10A is the designated forwarder in Ethernet segment 14 configured in single-active mode, the VLAN tag for the Ethernet AD route advertisement sent by PE router 10A is set to zero and the Extended Community attribute (which may be referred to as an Active-Standby bit) is set to indicate active-standby mode (e.g., 1). PE router 10A may send the Ethernet AD route advertisement to PE router 10D using any suitable L3 protocol such as BGP.

In accordance with techniques of the disclosure, routing engine 22 of PE router 10B also sends an Ethernet AD route advertisement to PE router 10D in advance of a network failure at PE router 10A because routing engine 22 determines that it is next designated forwarder of the EVI if PE router 10A experiences a network failure. This Ethernet AD route advertisement may be referred to as an "optional route" and is formatted in the same way as the Ethernet AD route advertisement sent by PE router 10A, but may include different values such an additional MPLS tag and/or a non-zero VLAN tag value. In some examples, the non-zero VLAN tag may be a value that corresponds to the EVI that includes the backup designated forwarder. Because information included in the Ethernet AD route advertisement from PE router 10B (e.g., the optional route) is different than the information included in the Ethernet AD route advertisement from PE router 10A (e.g., the mandatory route), PE router 10A is able to determine based on the information of the mandatory route that PE router 10A is the designated forwarder and PE router 10C is the backup designated forwarder.

That is, based on the designated forwarder election ordering that routing engine 22 previously generated, routing engine 22 may send information to PE router 10D that indicates PE router 10B is the next designated forwarder if PE router 10A experiences a network failure. In some examples, the information may be an Ethernet AD route advertisement that specifies, among other information, the Ethernet segment identifier and VLAN tag for Ethernet segment 14. The Ethernet AD route advertisement may further include an Extended Community attribute that can specify additional information. In the example of FIG. 2, to indicate that PE router 10B is the next designated forwarder in Ethernet segment 14 if PE router 10A experiences a network failure, the VLAN tag for the Ethernet AD route advertisement sent by PE router 10B is set to a non-zero value and the Extended Community attribute is set to indicate single-active mode. PE router 10B may send the Ethernet AD route advertisement to PE router 10D using any suitable L3 protocol such as BGP.

PE router 10D receives the Ethernet AD routes from PE routers 10A and 10B, respectively. PE router 10D may configure its forwarding information to forward Ethernet frames to PE router 10A as the designated forwarder in Ethernet segment 14. PE router 10D may use the forwarding information to configure the forwarding plane of PE router 10A. A forwarding plane may generally refer to software and/or hardware components of a network device used to forward Ethernet frames, and may include, for example, packet forwarding engines, a switch fabric that operatively couples the packet forwarding engines, interfaces coupled to the packet forwarding engines, and forwarding information. PE router 10D may also configure its forwarding information to forward Ethernet frames to PE router 10B if PE router 10D determines that the current designated forwarder, PE router 10A, experiences a network failure. Upon configuring its forwarding plane in accordance with the forwarding information, PE router 10D may forward Ethernet frames in Ethernet segment 14 using PE router 10A as the designated forwarder. An ingress PE router, such as PE router 10D that receives such a per-EVI Ethernet AD route considers a MAC address for that EVI as reachable via the advertising PE router 10B should the PE router 10A fail, where PE router 10A previously advertised a MAC advertisement route for a MAC address included in the EVI of Ethernet segment 14.

At a later time, PE router 10D may determine PE router 10A has experienced a failure. For instance, PE router 10A may determine a link failure has occurred at network link 16G, and sends an Ethernet AD route withdrawal message to PE router 10D. In other examples, PE router 10D may determine using BGP that PE router 10A is not responding to control plane messages. In any case, PE router 10D may update forwarding next hops for the EVI to PE router 10B for MAC routes initially learned from PE router 10A, in response to determining the network failure. That is, PE router 10D need not flush all MAC addresses previously learned for the EVI of the Ethernet segment and wait for PE routers 10B and 10C to perform a designated forwarder election in response to the failure because PE router 10B previously sent the Ethernet AD route indicating that it is the next designated forwarder if PE router 10A determines a link failure. Rather than flushing the MAC addresses and, therefore, flooding Ethernet frames to PE routers 10B and 10C as BUM traffic, PE router 10D updates the forwarding next hops to PE router 10B for the EVI and unicasts the frames to PE router 10B as the new designated forwarder in the EVI. Consequently, PE router 10D performs a fast failover to PE router 10B as the new designated forwarder in response to determining that a network failure has occurred with respect to PE router 10A.

Figure 3:
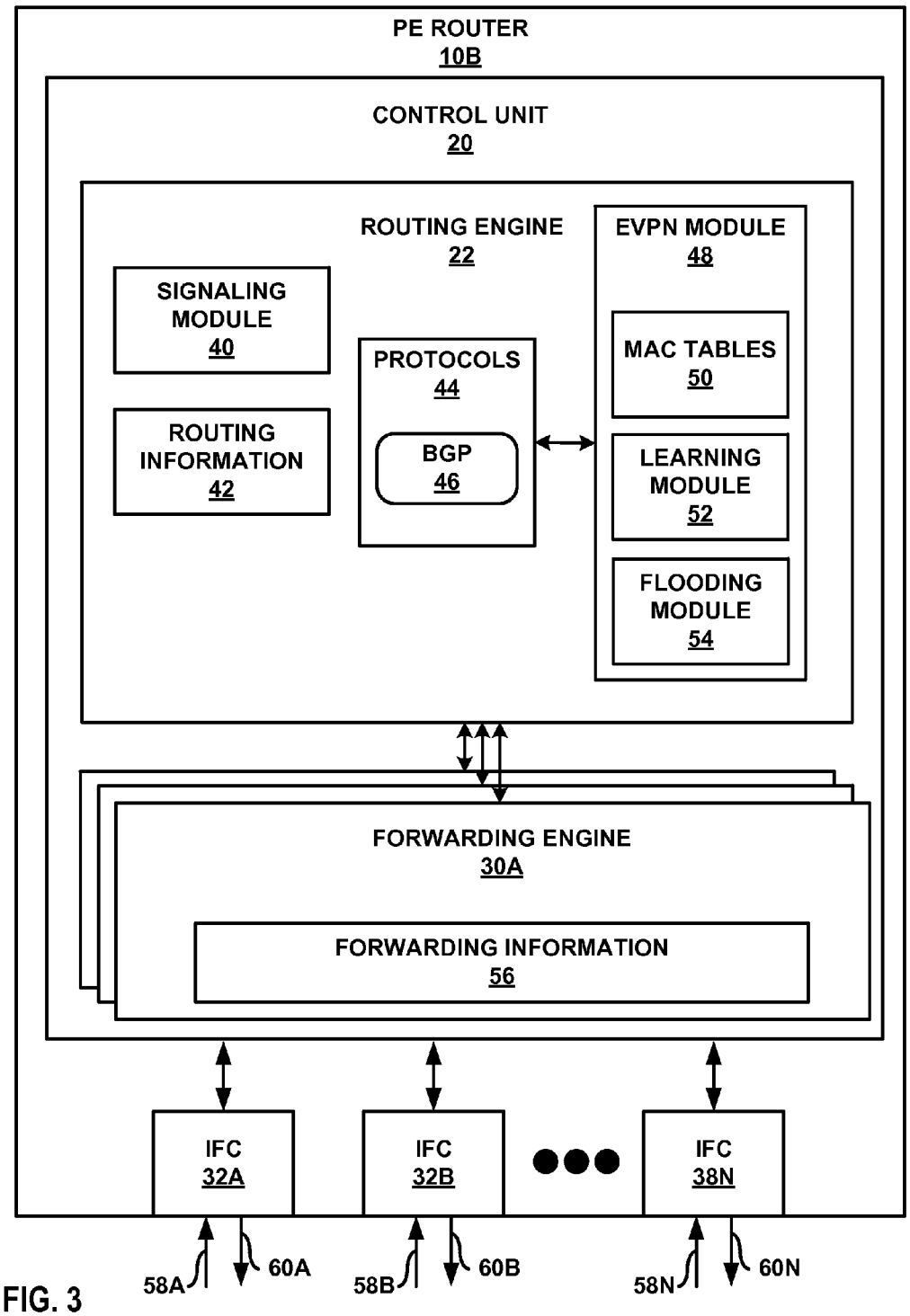
FIG. 3 is a block diagram illustrating further details of a provider edge (PE) router advertises its status as a backup designated forwarder in advance of a network failure, in accordance with techniques of the disclosure.

FIG. 3 is a block diagram illustrating further details of a provider edge (PE) router advertises its status as a backup designated forwarder in advance of a network failure, in accordance with techniques of the disclosure. PE router 10C includes a control unit 20 that includes a routing engine 22 coupled to a forwarding engine 30A-30N. PE router 10C includes interface cards 32A-38N ("IFCs 38") that receive packets via inbound links 58A-58N ("inbound links 58") and send packets via outbound links 60A-60N ("outbound links 60"). IFCs 32 are typically coupled to links 58, 60 via a number of interface ports (not shown). Inbound links 58 and outbound links 60 may represent physical interfaces, logical interfaces, or some combination thereof.

Routing engine 22 provides an operating environment for various protocols 44 that execute at different layers of a network stack. The protocols may be software processes executing on one or more processors. For example, routing engine 22 includes network protocols that operate at a network layer of the network stack. In the example of FIG. 3, network protocols include the Border Gateway Protocol (BGP) 46, which is a routing protocol. Routing engine 22 may include other protocols not shown in FIG. 3. Routing engine 22 is responsible for the maintenance of routing information 42 to reflect the current topology of a network and other network entities to which PE router 10C is connected. In particular, routing protocols periodically update routing information 42 to accurately reflect the topology of the network and other entities based on routing protocol messages received by PE router 10C.

Forwarding engines 30A-30N ("forwarding engines 30") represent hardware and logic functions that provide high-speed forwarding of network traffic. Forwarding engines 30 typically includes a set of one or more forwarding chips programmed with forwarding information that maps network destinations with specific next hops and the corresponding output interface ports. In general, when PE router 10C receives a packet via one of inbound links 58, one of forwarding engines 30 identifies an associated next hop for the data packet by traversing the programmed forwarding information based on information within the packet. One of forwarding engines 30 (either the ingress forwarding engine or a different egress forwarding engine) forwards the packet on one of outbound links 60 mapped to the corresponding next hop.

In the example of FIG. 3, forwarding engine 30A includes forwarding information 56. In accordance with routing information 42, forwarding engine 30A maintains forwarding information 56 that associates network destinations with specific next hops and corresponding interface ports. For example, routing engine 22 analyzes routing information 42 and generates forwarding information 56 in accordance with routing information 42. Forwarding information 56 may be maintained in the form of one or more tables, link lists, radix trees, databases, flat files, or any other data structures.

Forwarding engine 30A maintains forwarding information 56 for each Ethernet Virtual Instance (EVI) established by PE router 10C to associate network destinations with specific next hops and the corresponding interface ports. As described an FIG. 1, an EVI may define one or more Ethernet Segments in an EVPN. In general, when PE router 10C receives a data packet on a pseudowire of a given EVI via one of inbound links 58, forwarding engine 30A, for example, identifies an associated next hop for the data packet by traversing forwarding information 56 based on information (e.g., labeling information) within the packet. Forwarding engine 30A forwards the data packet on one of outbound links 60 to the corresponding next hop in accordance with forwarding information 56 associated with the EVI. At this time, forwarding engine 30A may push and/or pop labels from the packet to forward the packet along a correct pseudowire.

Control unit 42 also includes an EVPN module 48 having flooding module 54 that performs flooding and a learning module 52 that performs layer two (L2) learning, e.g., learning of customer device MAC addresses from inbound PWs and association of those customer MAC addresses with corresponding outbound PWs and output interfaces. EVPN module 48 may maintain MAC tables 50 for each EVI established by PE router 10C, or in alternative examples may maintain one or more MAC tables that are independent of each respective EVI. Learning module 52 and flooding module 54 may alternatively reside within forwarding engine 45.

Signaling module 40 outputs control-plane messages to automatically establish pseudowires, Ethernet Segments, and otherwise provision one or more EVPNs between PE router 10C and each of the other PE routers 10. Signaling module 40 may signal the PE routers 10 using one or more suitable L3 protocols, such as the BGP. Signaling module 40 can communicate with forwarding engine 30A to automatically update forwarding information 56.

EVPN module 48 executes in the control plane of PE router 10C and performs MAC address learning to automatically update portions of forwarding information 56 for each EVI established by PE router 10C. EVPN module 48 is invoked when PE router 10C receives data packets on the pseudowires (PWs) established by router PE router 10C for any of the PE routers 10 that are members of an EVI. EVPN module 48 performs MAC address learning using learning module 52 and updates the one of MAC tables 50 to initially record associations between the PWs connected to PE router 10C and the source MAC addresses of the EVPN customer devices from which the data packets were received on the PWs. For example, the one of MAC tables 50 records PW numbers that identify the PWs connected to PE router 10C, and records MAC addresses that identify the source customer devices of the data packets transmitted over the PWs. In effect, router PE router 10C, an L3 routing device (or in some examples, an L2 switching device), learns associations between MAC addresses and pseudowires (which are mapped to ports), much as an L2 switch learns associations between MAC addresses and ports. Forwarding information 56 may represent a virtual port binding and bridging table.

In order to update the one of the MAC tables 50, learning module 52 of EVPN module 48 in routing engine 22 performs L2 learning and association of L2 customer MAC addresses with specific PWs. Learning module 52 then communicates information recorded in the one of MAC tables 50 to configure forwarding information 56. In this way, forwarding engine 30A may be programmed with associations between each PW and output interface and specific source customer MAC addresses reachable via those PWs. EVPN module 48 may communicate with forwarding engines 30 to update the one of MAC tables 50 associated with the EVPN to associate the customer MAC addresses with the appropriate outbound PW. In some examples, forwarding engine 30A may maintain local MAC tables (not shown). After the update, MAC tables 50 include associations between the PWs connected to PE router 10C that are used to transport L2 traffic to the MAC addresses of the customer devices. In other words, MAC tables 50 records associations between the PWs and the network devices to which data packets may be sent on the PWs. For example, MAC tables 50 may record PW numbers that identify the PWs sourced by PE router 10C, and for those PW numbers identifies the MAC addresses of the reachable customer devices.

Forwarding engine 30A receives data packets on inbound links 58 that are destined for one of the PE routers in the EVPN. Forwarding engine 30A determines whether the destination customer MAC address of the data packets is included in the one of MAC tables associated with the EVPN. If the MAC address is included in the one of MAC tables, then PE router 10C forwards the data packets to the destination PE router on the PW associated with the MAC address based on forwarding information 56 associated with the EVPN. If the customer MAC address is not included in the one of MAC tables, PE router 10C floods the data packets to all of the PE routers via the PWs based on forwarding information 56 associated with the EVPN. Example details of MAC learning by a router are further described in U.S. patent application Ser. No. 12/246,810, "INTER-AUTONOMOUS SYSTEM (AS) VIRTUAL PRIVATE LOCAL AREA NETWORK SERVICE (VPLS)," filed on Oct. 7, 2008, the entire contents of which are incorporated herein by reference.

In some examples, techniques of the present disclosure may be implemented in EVPN module 48. For instance, at initial configuration and startup, EVPN module 48 may execute designated forwarder election algorithm. EVPN module 48 may cause BGP 46 to send control plane message to PE routers in Ethernet segment 13 including PE routers 10A and 10C. The control plane messages may request information from PE routers 10A and 10C, such as the IP addresses of the respective PE routers. PE router 10B may receive responses from each of PE routers 10A, 10C. Based on the responses, EVPN module 48 may determine the respective IP addresses for each of PE routers 10A, 10C.

As described in FIG. 2, EVPN module 48 may generate hashcodes that correspond to each of PE routers 10A-10C in Ethernet segment 14. The hashcode may be based on a common VLAN tag for Ethernet segment 14 and an IP address of a PE router. Upon generating hashcodes for each PE router, EVPN module 48 may generate an ordering of the hashcodes. Based on the ordering, EVPN module 48 may determine that, for example, the lowest ordered hashcode is the initial designated forwarder. EVPN module 48 may perform this designated forwarder election process multiple times, each time removing one of the hashcodes corresponding to a different PE router. In this way, the designated forwarder changes in each simulated designated forwarder election, such that EVPN module 48 may determine the designated forwarder for each different scenario where a different PE router fails.

In the example of FIG. 3, EVPN module 48 determines, based on the ordering of the hashcodes, that PE router 10A is the initial designated forwarder to for Ethernet segment 14. EVPN module 48 also determines that PE router 10B is the next designated forwarder in the event that PE router 10A experiences a network failure. In accordance with techniques of the disclosure, EVPN module 48 generates an Ethernet AD route advertisement. The AD route advertisement may be a message structured in accordance with BGP that includes the information indicated in Table 1:

TABLE 1

AD route advertisement

Route Descriptor (8 octets)
Ethernet Segment Identifier (10 octets)
Ethernet Tag ID (4 octets)
MPLS Label (3 octets)

The Ethernet AD route advertisement may further include an Extended Community attribute and VLAN tag that are not shown. The Ethernet Segment Identifier may identify Ethernet Segment 14. To indicate that PE router 10B is the backup designated forwarder, EVPN module 48 may set the VLAN tag to a non-zero value and set an Active-Standby bit in the Extended Community attribute to indicate single active mode. In some examples, PE router 10B may include an MPLS label in the Ethernet AD route advertisement, that is not otherwise included in the Ethernet AD route sent by PE router 10A (e.g., the mandatory EVPN module 48 then causes BGP 46 to send the Ethernet AD route advertisement to remote PE routers, such as PE router 10D. By predetermining the designated forwarder ordering in advance of a network failure, EVPN module 48 can send the Ethernet AD route advertisement to PE router 10D before a network failure occurs. If a network failure does later occur, as described below, PE router 10D can automatically start forwarding Ethernet frames to PE router 10B without waiting for a designated forwarder election process to commence and complete.

PE router 10D may receive the Ethernet AD route advertisement from PE router 10B. PE router 10D may include similar components as illustrated in PE router 10B of FIG. 3. A routing engine of PE router 10D may receive the AD route advertisement initially. The routing engine may configure forwarding information in the forwarding plane of PE router 10D, such that forwarding next hops are initially set to PE router 10A for MAC routes associated with Ethernet segment 14. The routing engine of PE router 10D may also configure its forwarding plane to designated PE router 10B as the designated forwarder in the event that PE router 10D determines that PE router 10A has experienced a network failure.

At a later time, PE router 10D may determine that PE router 10A has experience a network failure. In accordance with techniques of the disclosure, PE router 10D may update its forwarding plane to forward Ethernet frames destined for customer network 6B to PE router 10B. More specifically, PE router 10D may update forwarding next hops for MAC routes associated with Ethernet segment 14 to PE router 10B as the new designated forwarder. Consequently, PE router 10D can seamlessly update its forwarding plane to forward Ethernet frames to a new designated forwarder in Ethernet segment 14 in response to a network failure, rather than flooding PE routers 10B-10C until a new designated forwarder is elected by PE routers 10B-10C.

After determining the network failure at PE router 10A, PE router 10D may receive from PE router 10B, a routing protocol message that advertises at least one MAC route for Ethernet segment 14. The routing protocol message may be a MAC route advertisement. PE route 10D may configure its forwarding information to associate an Ethernet segment identifier of Ethernet segment 14 with a MAC address included in the at least one MAC route. PE router 10D may also configure, based at least in part on the forwarding information, at least one packet forwarding engine of PE router 10D to forward layer two frames corresponding to the MAC route to PE router 10B.

The techniques described herein do not require modifications to BGP signaling for the EVPN. If a PE router configured as described herein encounters another PE router that does not support this feature, the configured PE router operates according to the conventional operation. The architecture of PE router 10C illustrated in FIG. 3 is shown for exemplary purposes only. The disclosure is not limited to this architecture. In other embodiments, PE router 10C may be configured in a variety of ways. In one embodiment, for example, some of the functionally of routing engine 22 and forwarding engines 30 may be distributed within IFCs 32.

Elements of control unit 20 may be implemented solely in software, or hardware, or may be implemented as combinations of software, hardware, or firmware. For example, control unit 42 may include one or more processors, one or more microprocessors, digital signal processors (DSPs), application specific integrated circuits (ASICs), field programmable gate arrays (FPGAs), or any other equivalent integrated or discrete logic circuitry, or any combination thereof, which execute software instructions. In that case, the various software modules of control unit 20 may comprise executable instructions stored, embodied, or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer-readable storage media may include random access memory (RAM), read only memory (ROM), programmable read only memory (PROM), erasable programmable read only memory (EPROM), electronically erasable programmable read only memory (EEPROM), non-volatile random access memory (NVRAM), flash memory, a hard disk, a CD-ROM, a floppy disk, a cassette, a solid state drive, magnetic media, optical media, or other computer-readable media. Computer-readable media may be encoded with instructions corresponding to various aspects of PE router 10C, e.g., protocols. Control unit 20, in some examples, retrieves and executes the instructions from memory for these aspects.

Figure 4:
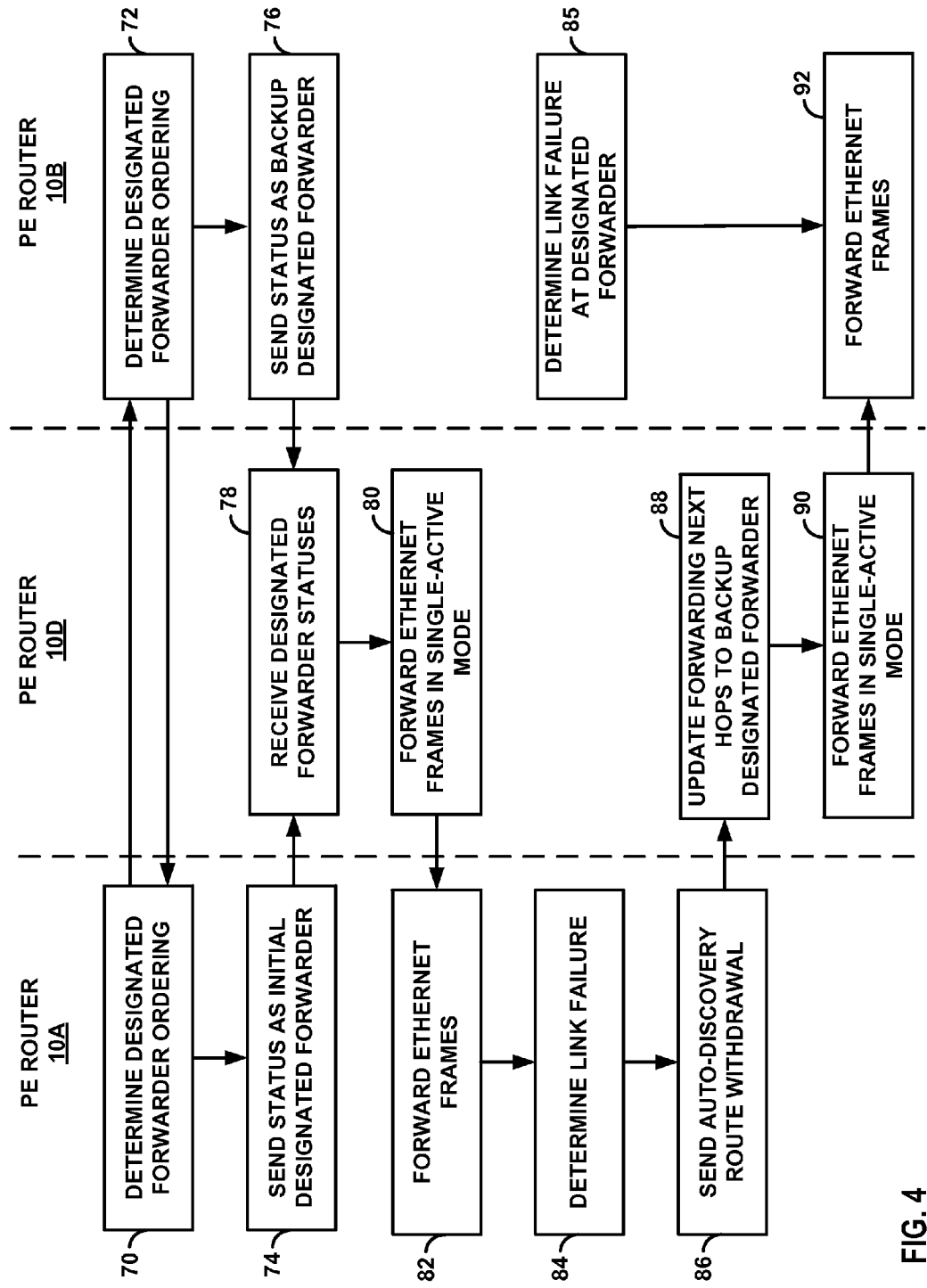
FIG. 4 is a flowchart illustrating example operations of multiple network devices for configuring a designated forwarder in advance of a network failure, in accordance with techniques of the disclosure.

FIG. 4 is a flowchart illustrating example operations of multiple network devices for configuring a designated forwarder in advance of a network failure, in accordance with techniques of the disclosure. Example operations in accordance with techniques of the disclosure are illustrated for example purposes with respect to PE router 10A, PE router 10B configured for a given EVI one or more EVIs of Ethernet segment 14 and PE router 10D. As shown in FIG. 4, PE router 10A may, at initial configuration and startup, determine an ordering of designated forwarders (70). Similarly, PE router 10B may also determine the ordering of designated forwarders using the same designated forwarder election algorithm (72). In this way, each of the PE routers in Ethernet segment 14 as shown in FIG. 1 determine the same ordering of designated forwarders.

PE router 10D may determine that it is initially the designated forwarder in Ethernet segment 14. PE router 10A may therefore send information indicating its status as the initial designated forwarder to PE router 10D (74). In some examples, PE router 10A may send the information as an Ethernet AD route. PE router 10B may also determine that it is the backup designated forwarder if PE router 10A experiences a network failure. PE router 10B may send information indicating its status as the backup designated forwarder to PE router 10D (76). In some examples, PE router 10A may send the information as an Ethernet AD route that further includes data indicating forwarding within Ethernet segment 14 will occur in single-active mode.

PE router 10D may receive the Ethernet AD routes from PE router 10A and PE router 10B, respectively (78). PE router 10D may configure its forwarding information to forward Ethernet frames in Ethernet segment 14 using the designated forwarder specified as PE router 10A. PE router 10D may also configure its forwarding information to use PE router 10B as the designated forwarder in the event of a network failure at PE router 10A. PE router 10D may forward Ethernet frames in single-active mode in accordance with the configured forwarding information that reflects the predetermination of the designated forwarder ordering (80). PE router 10A forwards the Ethernet frames received from PE router 10D and CE router 8B as the designated forwarder in single-active mode for Ethernet segment 14.

At a later time, PE router 10A may experience a network failure. For instance, network link 16G may fail, PE router 10A may fail, or network link 16D may fail. In any case, PE router 10A may determine the link failure has occurred (82). In some examples, PE router 10B may also determine the link failure corresponding to PE router 10A has occurred (85). For instance, PE router 10B may receiving one or more control plane messages. PE router 10A may send an Ethernet AD route withdrawal message to PE router 10D (86). PE router 10D may receive the Ethernet AD route withdrawal message and determine Ethernet segment 14 identified in the route. Using the forwarding information that PE router 10D previously configured based on the Ethernet AD route received from PE router 10B, PE router 10D may update the forwarding next hops for MAC routes associated Ethernet segment 14 (88). In particular, PE router 10 10D updates the forwarding next hopes for each of the MAC routes associated with Ethernet segment 14 to PE router 10B, which was initially determined as the backup designated forwarder. Consequently, PE router 10D may forward Ethernet frames to CE router 8B using PE router 10B in Ethernet segment 14 (90). Upon receiving such Ethernet frames, PE router 10B may forward the Ethernet frames to PE CE router 8B (92). As shown in FIG. 4, techniques of the disclosure enable PE router 10D to seamlessly and quickly forward Ethernet frames to PE router 10B as the designated forward in the event of a link failure because PE router 10D receiving the information specifying PE router 10B as the designated forwarder in advance from PE router 10B.

Figure 5:
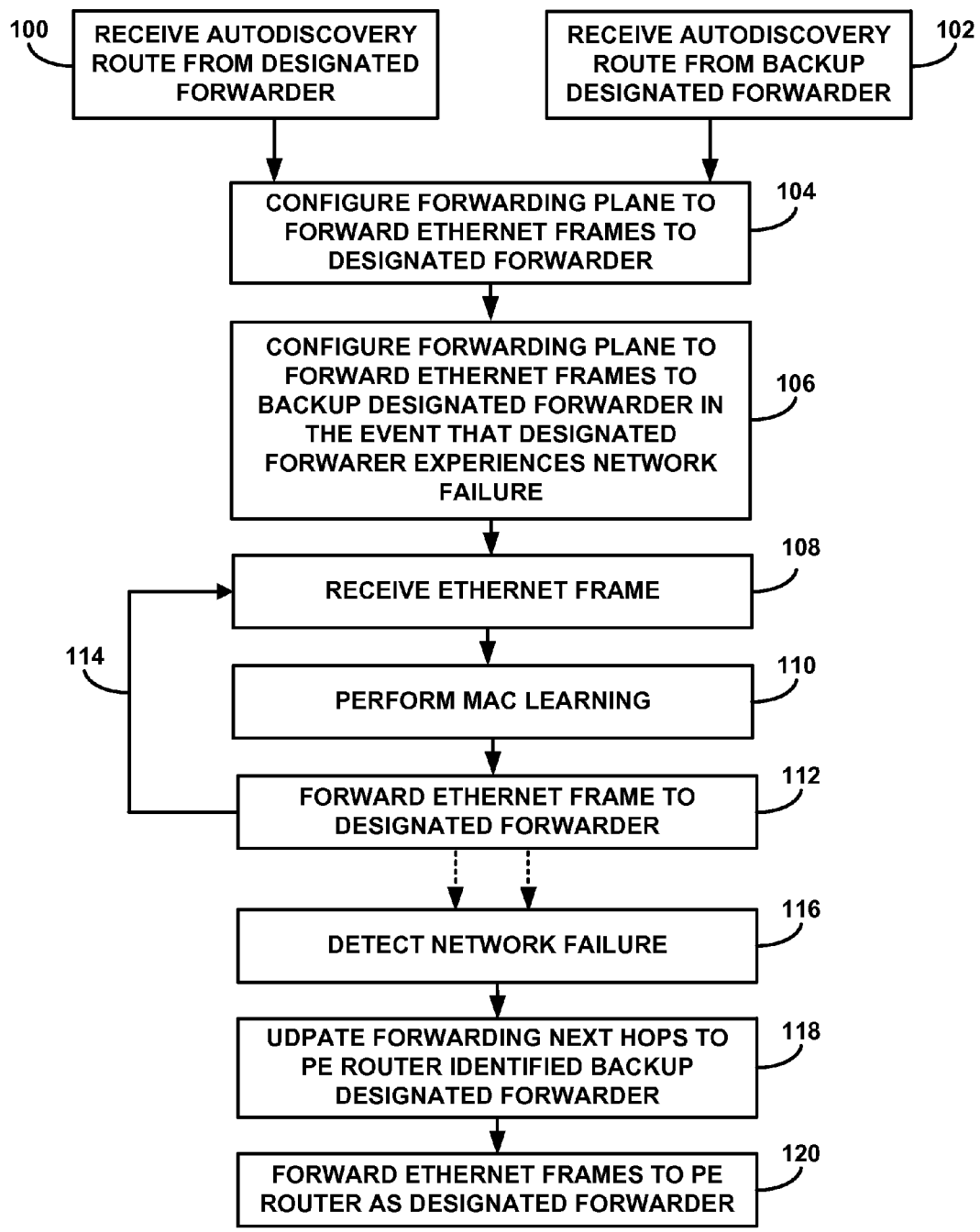
FIG. 5 is a flowchart illustrating example operations of a network device to receive designated forwarder information from multiple PE network devices and perform fast failover in response to a network failure, in accordance with techniques of the disclosure.

FIG. 5 is a flowchart illustrating example operations of a network device to receive designated forwarder information from multiple PE network devices and perform fast failover in response to a network failure, in accordance with techniques of the disclosure. Initially, during configuration and startup, PE routers 10A-10B may perform designated forwarder election processes as described in FIGS. 1-3. PE router 10A may send an Ethernet AD route advertisement to PE router 10D that indicates PE router 10A is initially the designated forwarder for Ethernet segment 14 (100). PE router 10B may also determine that it is the backup designated forwarder in the event that PE router 10A experiences a network failure. That is, PE router 10B, as the backup designated forwarder, is the next designated forwarder in Ethernet segment 14 if PE router 10A experiences a network forwarder. PE router 10B may send an Ethernet AD route advertisement to 10 PE router 10D that indicates PE router 10B is the backup designated forwarder for Ethernet segment 13 (102).

PE router 10D, in response to receiving the Ethernet AD route advertisements from PE routers 10A, 10B, respectively, may configure the forwarding plane of PE router 10D to forward Ethernet frames for Ethernet segment 14 to PE router 10A as the designated forwarder (104). PE router 10D may also configure the forwarding plane of PE router 10D to forward Ethernet frames to PE router 10B (i.e., the backup designated forwarder) in the event that PE router 10D later determines that PE router 10A has experienced a network failure (106).

In the example of FIG. 5, PE router 10D may receive Ethernet frames from customer network 6A (108). In some examples, PE router 10D may perform MAC learning based on the received packet (108). PE router 10D may also perform remote and local MAC learning as described in FIG. 1. In response to receiving the Ethernet frame, PE router 10D may forward the Ethernet frame to PE router 10A because PE router 10A is the designated forwarder for Ethernet segment 14 (112). As illustrated in FIG. 5, PE router 10D may continue to forward Ethernet frames using PE router 10A as the designated forwarder (114).

At a later time, PE router 10D receives an indication that a network failure has occurred at PE router 10A (116). For instance, PE router 10D may receive an Ethernet AD route withdrawal message from PE router 10A or PE router 10D may determine that PE router 10A is no longer responding to a BGP peer-to-peer session with PE router 10D. Because PE router 10D has already configured its routing plane to use PE router 10B as the designated forwarder for Ethernet segment 14 in the event of a network failure at PE router 10A, PE router 10D may update the forwarding next hops for MAC routes associated with Ethernet segment 14 to PE router 10B (118). That is, rather than flushing all of the MAC routes associated with the Ethernet AD route for PE router 10A, PE router 10D can disregard the Ethernet AD route withdrawal advertisement and configure its forwarding next hops for the MAC routes to the Ethernet AD route for PE router 10B. Consequently, PE router 10D may forward Ethernet frames to PE router 10B (120) rather than flooding the Ethernet frames to each of PE routers 10B-10C. In this way, techniques of the disclosure may provide fast failover in the event of a network failure and/or reduce the amount of flooding.

The techniques described in this disclosure may be implemented, at least in part, in hardware, software, firmware, or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware, firmware, or software components. Rather, functionality associated with one or more modules or units may be performed by separate hardware, firmware, or software components, or integrated within common or separate hardware, firmware, or software components.

The techniques described in this disclosure may also be embodied or encoded in an article of manufacture including a computer-readable medium encoded with instructions. Instructions embedded or encoded in an article of manufacture including a computer-readable medium encoded, may cause one or more programmable processors, or other processors, to implement one or more of the techniques described herein, such as when instructions included or encoded in the computer-readable medium are executed by the one or more processors. Computer readable storage media may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer readable media. In some examples, an article of manufacture may include one or more computer-readable storage media. In some examples, a computer-readable storage media may include non-transitory media. The term "non-transitory" may indicate that the storage medium is not embodied in a carrier wave or a propagated signal. In certain examples, a non-transitory storage medium may store data that can, over time, change (e.g., in RAM or cache).

Various embodiments of the invention have been described. These and other embodiments are within the scope of the following claims.

What is claimed is:

1. A method comprising:
    receiving, by a first provider edge (PE) network device and from a second PE network device of a plurality of PE network devices that provide an active-standby configuration for an Ethernet segment coupling the plurality of PE network devices to a customer network, a first control plane message that indicates the reachability of the second PE network device as a designated forwarder in the Ethernet segment;
    receiving, by the first PE network device and from a third PE network device of the plurality of PE network devices, a second control plane message comprising information that indicates, in the event of a network failure at the second PE router identified as the designated forwarder of the layer two segment, that the third PE network device of the plurality of PE network devices is the designated forwarder in the layer two segment;
    forwarding, by the first PE network device, layer two frames to the second PE network device identified as the designated forwarder in the layer two segment; and
    responsive to determining a network failure at the second PE network device, configuring, by the first PE network device and based at least in part on the information of the second control plane message, a forwarding plane of the first PE network device to forward layer two frames to the third PE network device as the designated forwarder.

2. The method of claim 1, wherein the second control plane message is formatted for an active-active mode configuration but includes information specifying the active-standby mode to indicate that in the event of a network failure at the second PE router identified as the designated forwarder of the layer two segment, the third PE network device of the plurality of PE network devices is the designated forwarder in the layer two segment.

3. The method of claim 2, wherein the second control plane message is a Border Gateway Protocol (BGP) message and the information of the control plane message further comprises:
    an Ethernet Auto-Discovery route;
    an VLAN tag that is not equal to zero; and
    an Extended Community attribute that is set to indicate single-active mode.

4. The method of claim 1, wherein configuring the forwarding plane of the first PE network device to forward layer two frames in the EVPN to the third PE network device further comprises:
    determining, by the first PE network device, one or more MAC routes associated with the layer two segment of the EVPN;
    updating, by first PE network device, forwarding next hops for each of the one or more MAC routes to the third PE network device; and
    forwarding, by the first PE network device and to the third PE network device, layer two frames that correspond to at least one of the one or more MAC routes.

5. The method of claim 1, wherein determining the network failure at the second PE network device further comprises at least one of:
    receiving, by the first PE network device and from the second PE network device, an Ethernet Auto-Discovery route withdrawal advertisement; and
    determining, by the first PE network device and using BGP, that the second PE network device is not available in a BGP peer-to-peer session.

6. The method of claim 1, wherein the first PE network device is a remote PE network device that is not configured as a part of the layer two segment, the method further comprising:
    after determining the network failure at the second PE network device, receiving, by the first PE network device and from the third PE network device, a control plane message that advertises at least one MAC route for the layer two segment;
    configuring, by the first PE network device, forwarding information of the first PE network device to associate a segment identifier of the layer two segment with a MAC address included in the at least one MAC route; and
    configuring, by the first provider edge network device and based at least in part on the forwarding information, at least one packet forwarding engine of the first provider edge network device to forward layer two frames corresponding to the MAC route to the third PE network device.

7. The method of claim 1, further comprising:
    receiving one or more MAC routes from the second PE network device, wherein the one or more MAC routes specify one or more of MAC addresses reachable by the second PE network device via the Ethernet segment;

receiving, by the first PE network device and from the second PE network device, a route withdrawal advertisement for a route indicated by the first control plane message; and removing, by the first PE network device, the route indicated by the first control plane message without flushing MAC addresses learned via MAC routes received by the first PE network device from the second PE network device that issued the first control plane message.

8. A network device, wherein the network device is a first provider edge (PE) network device, comprising:

an EVPN module that receives, by the first provider edge (PE) network device and from a second PE network device of a plurality of PE network devices that provide an active-standby configuration for an Ethernet segment coupling the plurality of PE network devices to a customer network, a first control plane message that indicates the reachability of the second PE network device as a designated forwarder in the Ethernet segment;

wherein the EVPN module receives, by the first PE network device and from a third PE network device of the plurality of PE network devices, a second control plane message comprising information that indicates, in the event of a network failure at the second PE router identified as the designated forwarder of the layer two segment, that the third PE network device of the plurality of PE network devices is the designated forwarder in the layer two segment;

a forwarding plane that forwards, by the first PE network device, layer two frames to the second PE network device identified as the designated forwarder in the layer two segment; and wherein the EVPN module, responsive to determining a network failure at the second PE network device, configures, by the first PE network device and based at least in part on the information of the second control plane message, a forwarding plane of the first PE network device to forward layer two frames to the third PE network device as the designated forwarder.

9. The network device of claim 8, wherein the second control plane message is formatted for an active-active mode configuration but includes information specifying the active-standby mode to indicate that in the event of a network failure at the second PE router identified as the designated forwarder of the layer two segment, the third PE network device of the plurality of PE network devices is the designated forwarder in the layer two segment.

10. The network device of claim 9, wherein the second control plane message is a Border Gateway Protocol (BGP) message and the information of the control plane message further comprises:

an Ethernet Auto-Discovery route;
an VLAN tag that is not equal to zero; and
an Extended Community attribute that is set to indicate single-active mode.

11. The network device of claim 8, wherein the EVPN module determines one or more MAC routes associated with the layer two segment of the EVPN;

wherein the EVPN module updates forwarding next hops for each of the one or more MAC routes to the third PE network device; and wherein the forwarding plane forwards, to the third PE network device, layer two frames that correspond to at least one of the one or more MAC routes.

12. The network device of claim 8, wherein the EVPN module receives, from the second PE network device, an Ethernet Auto-Discovery route withdrawal advertisement; and wherein the EVPN module determines, using BGP, that the second PE network device is not available in a BGP peer-to-peer session.

13. The network device of claim 8, wherein the first PE network device is a remote PE network device that is not configured as a part of the layer two segment, wherein the EVPN module, after determining the network failure at the second PE network device, receives, from the third PE network device, a control plane message that advertises at least one MAC route for the layer two segment;

wherein the EVPN module configures forwarding information of the first PE network device to associate a segment identifier of the layer two segment with a MAC address included in the at least one MAC route; and wherein the EVPN module configures, based at least in part on the forwarding information, at least one packet forwarding engine of the first provider edge network device to forward layer two frames corresponding to the MAC route to the third PE network device.

14. The network device of claim 8, wherein the EVPN module receives one or more MAC routes, from the second PE network device, wherein the one or more MAC routes specify one or more of MAC addresses reachable by the second PE network device via the Ethernet segment;

wherein the EVPN module receives, from the second PE network device, a route withdrawal advertisement for a route indicated by the first control plane message; and wherein the EVPN module removes the route indicated by the first control plane message without flushing MAC addresses learned via MAC routes received by the first PE network device from the second PE network device that issued the first control plane message.

15. A method comprising:

sending, to a first provider edge (PE) network device and from a second PE network device of a plurality of PE network devices that provide an active-standby configuration for an Ethernet segment coupling the plurality of PE network devices to a customer network, a first control plane message that indicates the reachability of the second PE network device as a designated forwarder in the Ethernet segment;

sending, by a third PE network device of the plurality of PE network devices and to the first PE network device, a second control plane message comprising information that indicates, in the event of a network failure at the second PE router identified as the designated forwarder of the layer two segment, that the third PE network device of the plurality of PE network devices is the designated forwarder in the layer two segment;

forwarding, by the first PE network device, layer two frames to the second PE network device identified as the designated forwarder in the layer two segment; and responsive to determining a network failure at the second PE network device, configuring, by the first PE network device and based at least in part on the information of the second control plane message, a forwarding plane of the first PE network device to forward layer two frames to the third PE network device as the designated forwarder.

16. The method of claim 15, further comprising:

sending, by the second PE network device and to the first PE network device, one or more MAC routes from the second PE network device, wherein the one or more MAC routes specify one or more of MAC addresses reachable by the second PE network device via the Ethernet segment;

sending, by the second PE network device and to the first PE network device, a route withdrawal advertisement for a route indicated by the first control plane message; and removing, by the first PE network device, the route indicated by the first control plane message without flushing MAC addresses learned via MAC routes received by the first PE network device from the second PE network device that issued the first control plane message.

17. The method of claim 15, wherein the second control plane message is formatted in accordance with an active-active mode configuration, wherein the second control plane message is a Border Gateway Protocol (BGP) message and the information of the control plane message further comprises:

an Ethernet Auto-Discovery route;

an VLAN tag that is not equal to zero; and an Extended Community attribute that is set to indicate single-active mode.

18. A network system comprising:

a network that includes:

a first provider edge (PE) network device;

second and third PE network devices that provide an active-standby configuration for an Ethernet segment coupling the second and third provider PE network devices to a customer network, and wherein the second PE network device comprises a first control plane that sends, to the first provider edge (PE) network device, a first control plane message that indicates the reachability of the second PE network device as a designated forwarder in the Ethernet segment;

wherein the third PE network device comprises a second control plane that sends, to the first PE network device, a second control plane message comprising information that indicates, in the event of a network failure at the second PE router identified as the designated forwarder of the layer two segment, that the third PE network device of the plurality of PE network devices is the designated forwarder in the layer two segment;

wherein the first PE network device comprises a forwarding plane that forwards layer two frames to the second PE network device identified as the designated forwarder in the layer two segment; and wherein the first PE network device comprises a control plane that, responsive to determining a network failure at the second PE network device, configures, based at least in part on the information of the second control plane message, the forwarding plane of the first PE network device to forward layer two frames to the third PE network device as the designated forwarder.

19. The network system of claim 18, wherein the second PE network device sends to the first PE network device, one or more MAC routes from the second PE network device, wherein the one or more MAC routes specify one or more of MAC addresses reachable by the second PE network device via the Ethernet segment;

wherein the second PE network device sends to the first PE network device, a route withdrawal advertisement for a route indicated by the first control plane message; and wherein the first PE network device removes the route indicated by the first control plane message without flushing MAC addresses learned via MAC routes received by the first PE network device from the second PE network device that issued the first control plane message.

20. The network system of claim 18, wherein the second control plane message is formatted in accordance with an active-active mode configuration, wherein the second control plane message is a Border Gateway Protocol (BGP) message and the information of the control plane message further comprises:

an Ethernet Auto-Discovery route;

an VLAN tag that is not equal to zero; and an Extended Community attribute that is set to indicate single-active mode.

* * * * *